UNITED STATES PATENT OFFICE.

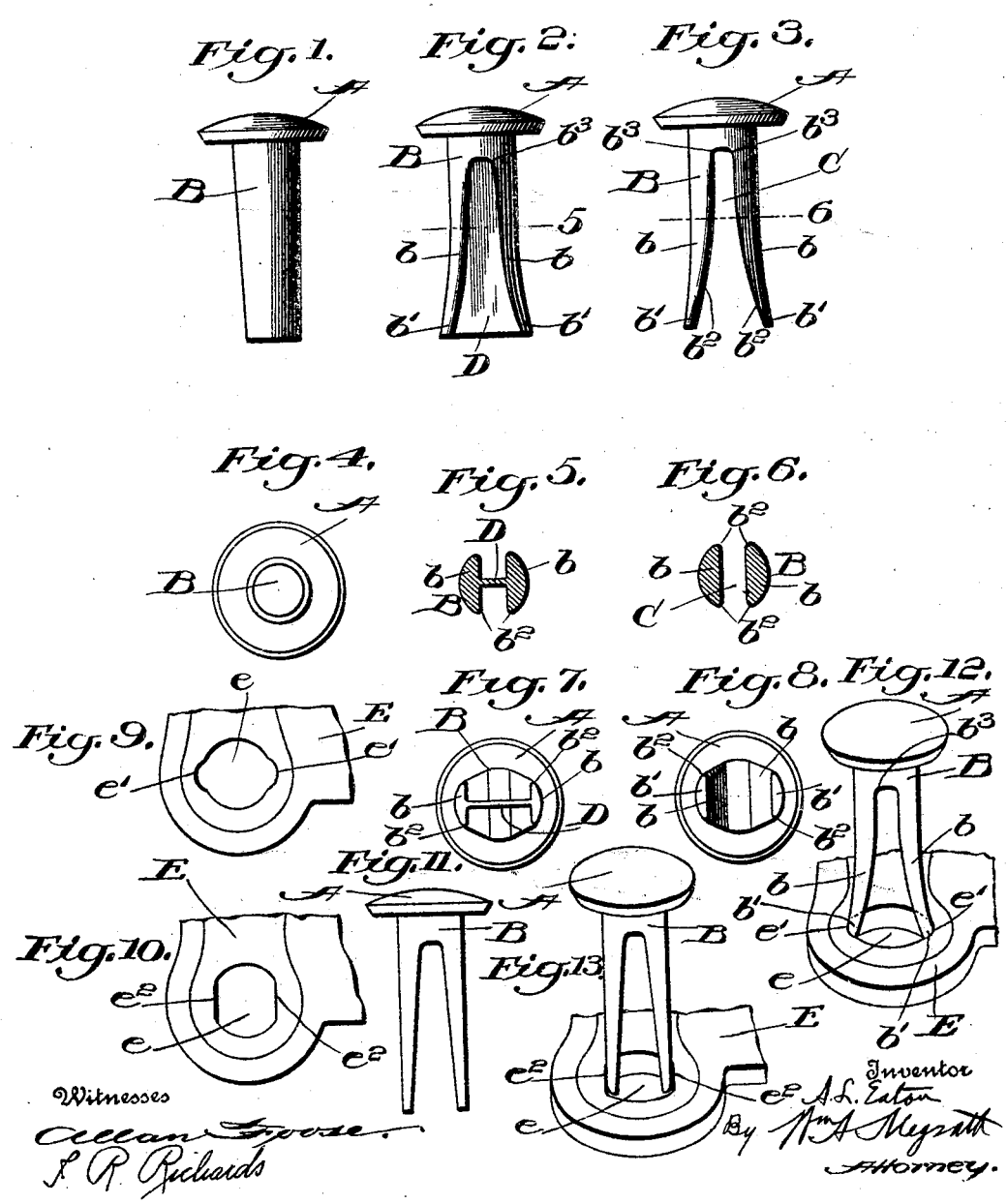

ANDREW L. EATON, OF NEW YORK, N. Y.; CLARA S. EATON EXECUTRIX OF SAID ANDREW L. EATON, DECEASED.

RIVET.

940,442.   Specification of Letters Patent.   Patented Nov. 16, 1909.

Application filed February 2, 1905. Serial No. 243,803.

*To all whom it may concern:*

Be it known that I, ANDREW L. EATON, residing at New York, in the county of New York and State of New York, have invented certain new and useful Improvements in Rivets, of which the following is a full, clear, and exact description, such as will enable others skilled in the art to which it appertains to make and use the same.

My invention relates to rivets and to that class made from solid wire which have slotted or divided shanks for holding the seams or meeting edges of belts made of leather, fabric and other material together.

I am aware that others have made rivets for this purpose, but there are certain objections to the use of the same. Heretofore in the use of rivets of this class, generally a metal plate was employed to hold the ends of the belt together, these plates having openings therein through which the rivets were inserted before being driven through the belt. These openings were larger than the shanks of the rivets and a special tool had to be used to hold the rivets in the plate until they were driven through the belt. This manner of holding the rivet is objectionable, because it takes time to fit the head of the rivet in the holder, thus taking more time to fasten the belt together.

One of the objects of my invention is to so form the rivet or the hole in the plate that the holder may be dispensed with, and upon the rivet being inserted in the plate, it will bear against the side of the opening and be held in the plate until driven into the belt.

As rivets which have heretofore been made have sharp edges which cut the belt, another object of my invention is to so construct a rivet that this objection is also overcome.

Other objects will appear from the hereinafter description.

The novel features of my invention will be understood by reference to the following description taken in connection with the drawings which are made a part of this application, and to the claims at the end of the specification.

Referring to the drawings in which the same reference characters indicate the same parts, Figure 1 is an elevation of a blank from which my rivet is made. Fig. 2 is an elevation of the blank after the last step of swaging it between dies to give it the proper shape. Fig. 3 is a side elevation of the finished rivet showing the shape of the prongs. Fig. 4 is an end view of the blank shown in Fig. 1 looking toward the head of the rivet. Fig. 5 is a section on the line 5 of Fig. 2. Fig. 6 is a section on the line 6 of Fig. 3. Fig. 7 is an end view of Fig. 2 looking toward the head of the rivet. Fig. 8 is a similar view of Fig. 3. Fig. 9 is a view of a plate showing the form of openings therein especially adapted to be used with this rivet shown by Fig. 3. Fig. 10 is a view of a plate showing the form of the opening adapted to be used with the ordinary rivet now used. Fig. 11 is an elevation of said rivet. Fig. 12 is a perspective view showing the opening in the plate illustrated in Fig. 9, with the rivet shown in Fig. 3 in said opening. Fig. 13 is a perspective view of the plate having the opening shaped as shown in Fig. 10, with an ordinary rivet held in said opening.

A represents the head of the rivet and B the shank thereof. This shank is provided with the slot C forming the two prongs $b$, $b$. The body of the prongs is substantially cylindrical in shape, but the ends $b'$, $b'$, are extended and curved substantially as shown. The inner edges of the prongs instead of being sharp or formed with acute angles, as has been the case heretofore, are rounded or curved, as indicated at $b^2$, so that there are no sharp curves or edges in this rivet to cut the material through which the rivet is driven. The rivet points of the prongs and the body are also rounded or curved, as shown at $b^3$.

The rivet may be made in various ways. However, I will here describe one method of making the same, although it is to be distinctly understood that I do not limit myself to this method.

In forming the rivet, I place the shank B of the blank, shaped as shown in Fig. 1, between dies which press or swage the middle part of the blank into a web. This requires two or three operations. Fig. 2 shows the web of the blank after the last step of swaging, and before the web is removed therefrom. After the blank is swaged to the shape shown in said figure, I remove the web by punching it out, or I may remove it by cutting it out by a milling or cutting tool. After the web is removed, I obtain a rivet shaped as shown in Fig. 3 of the drawings.

Instead of separating the ends of the prongs during the swaging operation, I may swage the said ends substantially straight, and after the web is removed, curve the ends of the prongs, as indicated at $b'$, Figs. 3 and 8. The dies used in forming the web D in the blank may be so shaped that during the swaging operation, the rounded or curved edges $b^2$ are formed on the prongs at the same time the upper portion of the slot is curved, as shown at $b^3$. The ends $b'$ of the prongs are partly elastic, and they are so shaped as to be inserted with the binding action into the belt fastener plate having openings therein of the ordinary size. It will be observed that in the form shown the bodies of the prongs are parallel with each other and the ends only diverge. Thus said diverging and partly elastic ends may be most conveniently inserted into an opening adapted to compress the same into approximately the vertical planes of the bodies of the prongs. When they are thus inserted, the rivets will stay in an upright position until they are driven home in the belt, and as the prongs are now, or may be approximately parallel with each other throughout their length, the rivet may readily be driven to place.

In order to be sure that the prongs will lie transversely of the belt when inserted, I provide the belt fastener plate E, with openings $e$, and make the opposite sides of said openings enlarged, as shown at $e'$, to constitute guides for the rivet. Upon the ends $b'$ of the rivet being inserted in these enlarged openings, the rivet is so placed as to be clenched transversely of the belt, and I make the enlarged portion $e'$ of the opening and the ends of the rivet of such relative dimensions, that the ends $b'$ of the prongs of the rivet will fit tightly therein, so that the rivet will be held in an upright position, and the special holder is thus dispensed with. Another advantage of the enlarged portions of the opening $e$ is that they will permit the rivet to be easily withdrawn when the plate is to be changed to shorten the belt, or for any other purpose.

In Fig. 10 I have shown a belt fastener plate so constructed that when an ordinary rivet is used therewith, the said rivet can be held in an upright position before being driven home without a special holder for the rivet. In this construction, the opening like that of the other is irregular in shape, but its irregularity is produced by making it straight at opposite sides, as shown at $e^2$. These straight portions also form guides which aid in the positioning of the rivet. I make the distance between these straight sides or chords $e^2$, the diameter of the ordinary rivet of such length that the outer surface of the rivet will bind against the inner surface of these chords with sufficient force as will hold the rivet in an upright position. Of course, it will be understood that I may make the ordinary rivet and the ordinary opening in the plate of such dimensions that they will bind to hold the rivet in an upright position when the rivet is partly inserted in the plate.

When rivets as heretofore constructed are used with the prongs transverse of the belt, the sharp edges of the prongs cut the belt and lessen the life thereof. With my improved rivet having the rounded edges $b^2$, it will be seen that this objection is entirely dispensed with, and there is no cutting of the belt.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

Having now described my invention, what I claim as new and desire to secure by Letters Patent is:

1. A rivet having prongs the bodies of which are substantially parallel with each other and the free extremities of which are elastic and diverge laterally beyond the planes of said bodies when unconfined and are adapted to be compressed into approximately the planes of said bodies when inserted into driving position into the element by which it is to be directed.

2. A rivet having prongs the bodies of which are substantially parallel with each other and the free extremities of which are elastic and diverge laterally beyond the planes of said bodies when unconfined, and means having an opening to receive said prongs, said opening adapted to compress said free extremities into approximately the planes of the bodies when the prongs are inserted thereinto to be driven.

3. In a device of the class described, a plate having an opening therein, said opening being enlarged at opposite sides, a rivet having prongs, the ends of the prongs being adapted to be inserted and held in the enlarged portion of the opening, as and for the purpose set forth.

4. In a device of the class described, a plate having an opening which is enlarged at opposite sides, and a rivet having prongs which are adapted to be forced through the enlarged portion of said opening, said prongs having diverging elastic free extremities.

5. In a device of the class described, a plate having an opening therein, said opening being enlarged at opposite sides, and a rivet having diverging prongs, the ends of the prongs being adapted to be inserted and held in the enlargements of the opening, and said enlargements being so located in the plate that the prongs must lie in a predetermined position in relation thereto.

6. The combination of a rivet having a head portion, a cylindrical shank portion of less diameter than and extending from the head portion, and spaced prongs extended from the shank portion with opposite outer surfaces divergent from each other toward the points of the said prongs and extended from the tips of said prongs toward said shank and separated at a distance greater than the diameter of the shank portion, and a plate having an opening for the passage of the shank and prongs of said rivet, such opening having a circular central part to receive the cylindrical shank portion, and lateral notches extended at opposite sides of said circular portion and adapted to receive the divergent prongs of the rivet.

7. In combination, a plate having an elongated opening which is transversely wider across its central portion; and a rivet having prongs and an overhanging head, the tips of the said prongs being separated to adapt them to be confined between the ends of the opening to support the rivet in setting position, and said prongs having a cross-section near the head adapted to the outline of the central portion of the plate opening.

8. In combination, a rivet having prongs and an overhanging head, the prongs at their tips being farther apart than the distance across their cross-section where they join the head; and a plate having an opening adapted to the cross-section of the prongs where they join the head and having a recess therefrom, said recessed opening being adapted to confine the tips of the prongs between the end wall of the recess and the opposite wall of the opening to support the rivet.

In testimony whereof I affix my signature, in the presence of two witnesses.

ANDREW L. EATON.

Witnesses:
LOUIS N. WHEALTON,
T. R. RICHARDS.